(12) United States Patent
Stein et al.

(10) Patent No.: US 8,290,056 B2
(45) Date of Patent: Oct. 16, 2012

(54) VIDEO DECODER SYSTEM AND METHOD WITH VIDEO ENHANCEMENT USING DIRECT CONTRAST ENHANCEMENT IN THE SPATIAL DOMAIN

(75) Inventors: Yosef Stein, Sharon, MA (US); Hazarathaiah Malepati, Norwood, MA (US)

(73) Assignee: Analog Devices, Inc., Norwood, MA (US)

( * ) Notice: Subject to any disclaimer, the term of this patent is extended or adjusted under 35 U.S.C. 154(b) by 1198 days.

(21) Appl. No.: 12/151,382

(22) Filed: May 6, 2008

(65) Prior Publication Data
US 2009/0196352 A1    Aug. 6, 2009

Related U.S. Application Data

(60) Provisional application No. 61/063,027, filed on Jan. 31, 2008.

(51) Int. Cl.
*H04N 7/12* (2006.01)
(52) U.S. Cl. .................................. 375/240.18
(58) Field of Classification Search .......... None
See application file for complete search history.

(56) References Cited

U.S. PATENT DOCUMENTS

| | | | |
|---|---|---|---|
| 5,168,375 A | 12/1992 | Reisch et al. | |
| 5,253,055 A | 10/1993 | Civaniar et al. | |
| 5,740,284 A | 4/1998 | Wober et al. | |
| 5,784,494 A * | 7/1998 | Strongin et al. | 375/240.23 |
| 5,832,135 A | 11/1998 | Merhav et al. | |
| 5,903,312 A * | 5/1999 | Malladi et al. | 375/240.03 |
| 5,933,538 A * | 8/1999 | Fukuda et al. | 375/240.18 |
| 6,067,384 A | 5/2000 | Manickam et al. | |
| 6,233,280 B1 * | 5/2001 | Kim et al. | 375/240.21 |
| 6,301,304 B1 * | 10/2001 | Jing et al. | 375/240.25 |
| 6,304,604 B1 * | 10/2001 | Adiletta et al. | 375/240.18 |
| 6,507,614 B1 * | 1/2003 | Li | 375/240.03 |
| 6,525,783 B1 * | 2/2003 | Kim et al. | 375/240.23 |
| 6,526,099 B1 | 2/2003 | Christopoulos et al. | |
| 6,584,156 B1 * | 6/2003 | Gu et al. | 375/240.18 |
| 6,687,296 B1 * | 2/2004 | Sato et al. | 375/240.12 |
| 6,728,313 B1 * | 4/2004 | Tu et al. | 375/240.03 |
| 6,731,686 B1 * | 5/2004 | Sudharsanan et al. | 375/240.25 |
| 6,853,683 B2 * | 2/2005 | Song et al. | 375/240.25 |
| 7,295,609 B2 * | 11/2007 | Sato et al. | 375/240.18 |
| 2001/0008544 A1 * | 7/2001 | Ishiyama | 375/240.12 |
| 2002/0009150 A1 * | 1/2002 | Le Maguet | 375/240.25 |

(Continued)

OTHER PUBLICATIONS

Dugad, "A Fast Scheme for Image Size Change in the Compressed Domain", IEEE Transactions on Circuits and Systems for Video Technology, 11(4), Apr. 2001, 461-474.

(Continued)

*Primary Examiner* — Gregory Sefcheck
*Assistant Examiner* — Joshua Smith
(74) *Attorney, Agent, or Firm* — Kenyon & Kenyon LLP

(57) ABSTRACT

Video decoding with video enhancement using direct contrast enhancement in the spatial domain including transforming the decoded intramacroblock output to a matrix of spatial domain coefficients; multiplying the spatial domain coefficients with the corresponding intramacroblock enhancement matrix elements of an intramacroblock enhancement matrix to provide enhanced spatial coefficients; transforming said enhanced spatial coefficients to the temporal domain to generate an enhanced decoded intramacroblock; multiplying the spatial domain intermacroblock coefficients from the entropy decoder of the video decoder with the corresponding intermacroblock enhancement matrix elements of an intermacroblock enhancement matrix to provide enhanced spatial coefficients, and transforming the enhanced spatial coefficients to generate enhanced decoded residual coefficients.

27 Claims, 6 Drawing Sheets

U.S. PATENT DOCUMENTS

| | | | |
|---|---|---|---|
| 2002/0012470 A1* | 1/2002 | Luna et al. | 375/240.03 |
| 2002/0113898 A1* | 8/2002 | Mitsuhashi | 375/240.17 |
| 2003/0021486 A1 | 1/2003 | Acharya | |
| 2003/0123547 A1* | 7/2003 | Song | 375/240.13 |
| 2003/0194008 A1* | 10/2003 | Acharya et al. | 375/240.12 |
| 2004/0013195 A1* | 1/2004 | Panusopone et al. | 375/240.2 |
| 2005/0058204 A1* | 3/2005 | Fernandes | 375/240.2 |
| 2005/0105612 A1* | 5/2005 | Sung et al. | 375/240.2 |
| 2005/0147162 A1* | 7/2005 | Mihara | 375/240.03 |
| 2005/0147163 A1* | 7/2005 | Li et al. | 375/240.12 |
| 2005/0152457 A1* | 7/2005 | Regunathan et al. | 375/240.12 |
| 2005/0226322 A1* | 10/2005 | Van Der Vleuten et al. | 375/240.18 |
| 2005/0243919 A1* | 11/2005 | Ishiyama | 375/240.03 |
| 2005/0259733 A1* | 11/2005 | Le Maguet | 375/240.12 |
| 2006/0029132 A1* | 2/2006 | Song et al. | 375/240.03 |
| 2006/0034372 A1* | 2/2006 | Song et al. | 375/240.03 |
| 2006/0268981 A1* | 11/2006 | Owens | 375/240.18 |
| 2007/0268968 A1* | 11/2007 | Sakazume | 375/240.16 |
| 2007/0280357 A1* | 12/2007 | Sung | 375/240.25 |
| 2008/0095245 A1* | 4/2008 | Reznik | 375/240.25 |
| 2008/0170620 A1* | 7/2008 | Zhang | 375/240.18 |
| 2008/0219345 A1* | 9/2008 | Li et al. | 375/240.2 |

OTHER PUBLICATIONS

Park, "Arbitrary Ratio Image Resizing Using Fast DCT of Composite Length for DCT-Based Transcoder", IEEE Transacations on Image Processing, 15(2), Feb. 2006, 494-500.

* cited by examiner

VIDEO DECODER SYSTEM AND METHOD WITH VIDEO ENHANCEMENT USING DIRECT CONTRAST ENHANCEMENT IN THE SPATIAL DOMAIN

RELATED APPLICATIONS

This application claims benefit of and priority to U.S. Provisional Application Ser. No. 61/063,027 filed Jan. 31, 2008 incorporated herein by this reference.

FIELD OF THE INVENTION

This invention relates to a system and method of video decoding with video enhancement using direct contrast enhancement in the spatial domain.

BACKGROUND OF THE INVENTION

Image enhancement techniques are used to emphasize and sharpen image features for display and analysis. Many different video decoders may be used, e.g. H.264, MPEG4, WMV, VC1. In order to reduce the data transmitted in systems with limited bandwidth or to reduce storage requirements of video media like DVD, H.264, for example, takes advantage of statistical redundancies (spatial and temporal) in video signals. A group of picture's size and sequence is specified such that periodically an entire frame will be encoded completely using a Discrete Cosine like Transform (DCT). Such pictures/frames are known as intra-frames, and the blocks that form them intramacroblocks. All other frames are made up from a mixture of these and intermacroblocks. These are encoded using prediction methods that encode only the difference between the macroblocks and some reference macroblock in a previous or future frame.

Both intra and intermacroblocks are transformed using a 2 dimensional DCT like transform. The DC (mean luminance) level and low spatial frequencies dominate in most image content, so this transformation results in the compaction of most of the energy into just a few of the elements of the block. Coefficients in the DCT domain correspond to weights of different spatial frequencies, with increasing spatial frequency starting for the DC component at the position top left in the matrix and moving towards the lower right corner. This invention realizes that performing contrast enhancement filtering within each H.264 video decoder or other video decoder macroblock can be achieved by increasing the value of specific DCT coefficients corresponding to the spatial frequencies desired to be enhanced.

It is therefore an object of this invention to provide an improved video decoder system and method with video enhancement using direct contrast enhancement in the spatial/Transform domain.

It is a further object of this invention to provide such an improved video decoder system and method with video enhancement using direct contrast enhancement in the spatial/Transform domain simply applicable to existing video decoders.

It is a further object of this invention to provide such an improved video decoder system and method with video enhancement using direct contrast enhancement in the spatial/Transform domain.

It is a further object of this invention to provide such an improved video decoder system and method with video enhancement using direct contrast enhancement in the spatial/Transform domain which consumes low additional MIPS (million instructions per second) and low additional complexity.

It is a further object of this invention to provide such an improved video decoder system and method with video enhancement using direct contrast enhancement in the spatial/Transform domain which provides better video quality even at low bit stream rates.

It is a further object of this invention to provide such an improved video decoder system and method with video enhancement using direct contrast enhancement in the spatial/Transform domain which allows for individual user enhancement control.

The invention results from the realization that improved video enhancement using direct contrast enhancement in the spatial/Transform domain can be achieved with intramacroblocks by transforming the decoded intramacroblock output to a matrix of spatial/Transform domain coefficients multiplying them by the corresponding elements of an intramacroblock enhancement matrix to provide enhanced spatial coefficients and then transforming the enhanced spatial coefficients to the temporal domain to generate an enhanced decoded intramacroblock and can be achieved with intermacroblocks by multiplying the spatial domain intermacroblock coefficients from the entropy decoder with the corresponding elements of an intermacroblock enhancement matrix to provide enhanced spatial coefficients and transforming the enhanced spatial coefficients to generate enhanced decoded residual coefficients.

The subject invention, however, in other embodiments, need not achieve all these objectives and the claims hereof should not be limited to structures or methods capable of achieving these objectives.

This invention features a video decoder with video enhancement using direct contrast enhancement in the spatial domain including a transform circuit responsive to the decoder intrablock output for converting the decoded video intramacroblock output to a matrix of spatial domain coefficients. There is an intramacroblock enhancement matrix having a corresponding matrix of elements. A multiplier circuit combines the spatial domain coefficients with the corresponding intramacroblock enhancement matrix elements to provide enhanced spatial coefficients. An inverse transform circuit responds to the multiplier circuit for converting the enhanced spatial coefficients to the temporal domain to generate an enhanced decoded intramacroblock output.

In a preferred embodiment the video decoder may further include an intermacroblock enhancement matrix including a matrix of elements; a multiplier circuit for combining the spatial domain intermacroblock coefficients from the entropy decoder of the video decoder with the corresponding intermacroblock enhancement matrix elements to provide enhanced spatial coefficients to the inverse transform circuit of the video decoder to generate an enhanced decoded residual coefficient. The intramacroblock enhancement matrix and intermacroblock enhancement matrix may be of different rank. In the intramacroblock enhancement matrix and intermacroblock enhancement matrix the same spatial frequencies may have the same enhancement element. The intermacroblock enhancement matrix may have the same rank as the entropy decoder. The enhancement elements may be different for each of the enhancement matrices. The intermacroblock and the intramacroblock enhancement matrices may include a gain adjust circuit for varying the enhancement matrix elements. The gains of the gain adjust circuits may be different for the enhancement matrices. The gains of the gain adjust circuits may be the same for the enhancement matrices.

The video decoder may be an H.264 decode. The intramacroblock enhancement matrix may have a rank of 8. The transform circuit may be an 8 rank DCT and the inverse transform circuit may be an 8 rank IDCT. The H.264 decoder may be base profile and the intermacroblock enhancement matrix may have a rank of 4. The H.264 decoder may be main profile and the intermacroblock enhancement matrix may have a rank of 4. The H.264 decoder may be high profile and the intermacroblock enhancement matrix may have a rank of 8. The transform circuit may be a DCT circuit. The inverse transform circuit may be a IDCT circuit. The inverse transform circuit of the video decoder may be integer transform circuit.

This invention also features a video decoder with video enhancement using direct contrast enhancement in the spatial domain including an intermacroblock enhancement matrix including a matrix of elements. A multiplier circuit combines the spatial domain intermacroblock coefficients from the entropy decoder of the video decoder with the corresponding intermacroblock enhancement matrix elements to provide enhanced spatial coefficients to the inverse transform circuit of the video decoder to generate an enhanced decoded residual coefficient.

This invention also features a video decoder with video enhancement using direct contrast enhancement in the spatial domain including a transform circuit responsive to the decoder intrablock output for converting the decoded video intramacroblock output to a matrix of spatial domain coefficients. There is an intramacroblock enhancement matrix having a corresponding matrix of elements. A multiplier circuit combines the spatial domain coefficients with the corresponding intramacroblock enhancement matrix elements to provide enhanced spatial coefficients. An inverse transform circuit responds to the multiplier circuit for converting the enhanced spatial coefficients to the temporal domain to generate an enhanced decoded intramacroblock output. There is an intermacroblock enhancement matrix including a matrix of elements. A multiplier circuit combines the spatial domain intermacroblock coefficients from the entropy decoder of the video decoder with the corresponding intermacroblock enhancement matrix elements to provide enhanced spatial coefficients to the inverse transform circuit of the video decoder to generate an enhanced decoded residual coefficient.

This invention also features a method of video decoding with video enhancement using direct contrast enhancement in the spatial domain including transforming the decoded intramacroblock output to matrix of spatial domain coefficients. The spatial domain coefficients are multiplied with the corresponding intramacroblock enhancement matrix elements of an intramacroblock enhancement matrix to provide enhanced spatial coefficients. The enhanced spatial coefficients are transformed to the temporal domain to generate an enhanced decoded intramacroblock.

In a preferred embodiment the method of video decoding with video enhancement using direct contrast enhancement in the spatial domain may further include multiplying the spatial domain intermacroblock coefficients from the entropy decoder of the video decoder with the corresponding intermacroblock enhancement matrix elements of an intermacroblock enhancement matrix to provide enhanced spatial coefficients; and transforming the enhanced spatial coefficients to generate enhanced decoded residual coefficients. The intramacroblock enhancement matrix and intermacroblock enhancement matrix may be of different rank. In the intramacroblock enhancement matrix and intermacroblock enhancement matrix the same spatial frequencies may have the same enhancement element. The intermacroblock enhancement matrix may have the same rank as the entropy decoder. The enhancement elements may be different for each of the enhancement matrices. The spatial domain may further include adjusting the gains of the enhancement matrices. The video decoder may be an H.264 decoder. The intramacroblock enhancement matrix may have a rank of 8. The H.264 decoder may be a base profile and the intermacroblock enhancement may have a rank of 4. The H.264 decoder may be a high profile and the intermacroblock enhancement may have a rank of 8.

This invention also features a method of video decoding with video enhancement using direct contrast enhancement in the spatial domain including multiplying the spatial domain intermacroblock coefficients from the entropy decoder of the video decoder with the corresponding intermacroblock enhancement matrix elements of an intermacroblock enhancement matrix to provide enhanced spatial coefficients. The enhanced spatial coefficients are transformed to generate enhanced decoded residual coefficients.

This invention also features a method of video decoding with video enhancement using direct contrast enhancement in the spatial domain including transforming the decoded intramacroblock output to matrix of spatial domain coefficients. The spatial domain coefficients are multiplied with the corresponding intramacroblock enhancement matrix elements of an intramacroblock enhancement matrix to provide enhanced spatial coefficients. The enhanced spatial coefficients are transformed to the temporal domain to generate an enhanced decoded intramacroblock. The spatial domain intermacroblock coefficients from the entropy decoder of the video decoder are multiplied with the corresponding intermacroblock enhancement matrix elements of an intermacroblock enhancement matrix to provide enhanced spatial coefficients; and transforming the enhanced spatial coefficients to generate enhanced decoded residual coefficients.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
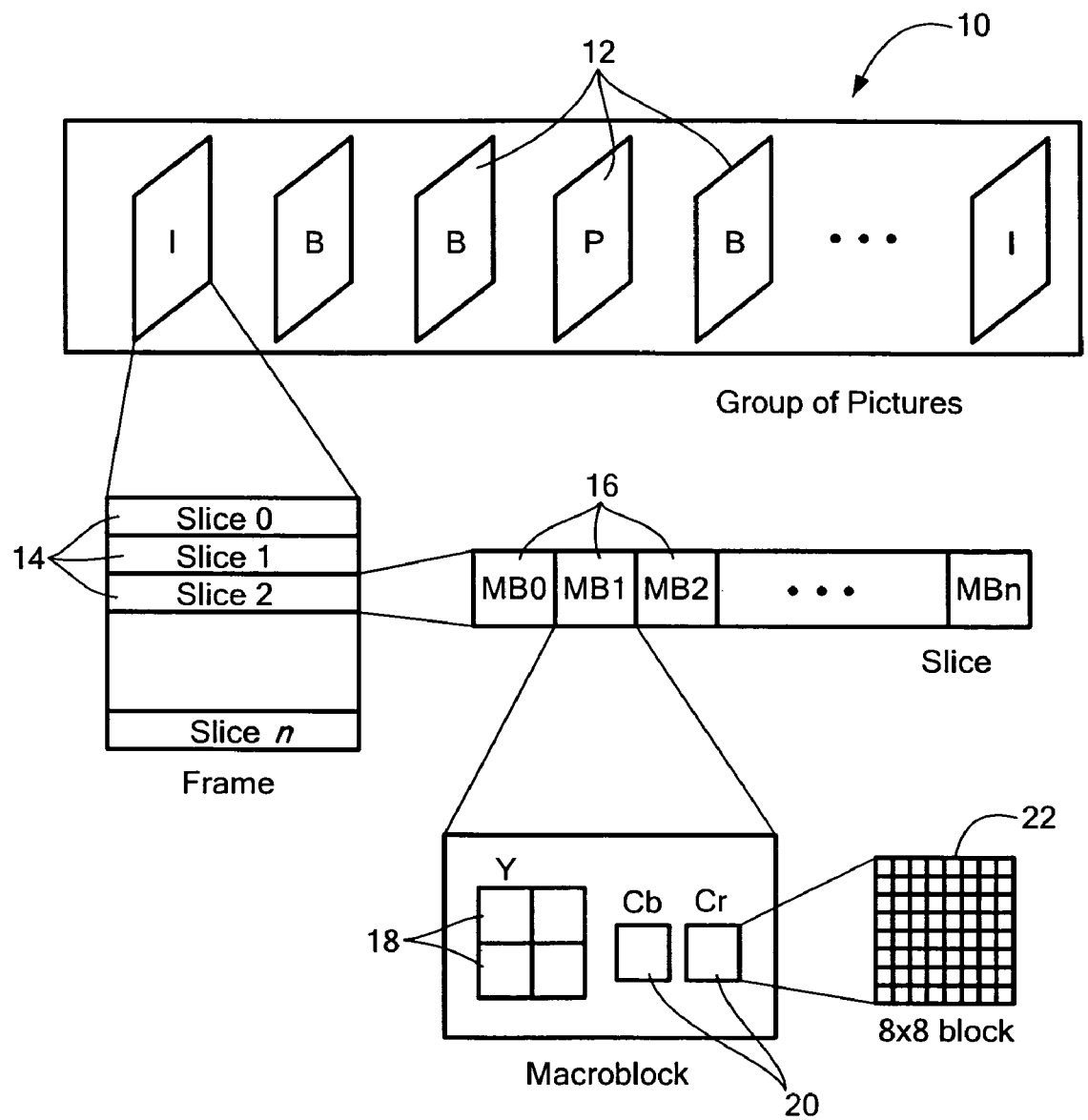
FIG. 1 is an illustration of a typical bit stream including intra-(I) and inter (P,B) macroblocks.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a typical bit stream 10 composed of a group of pictures or frames 12 which may be either intra, I, bi-directional predictive, B, or predictive, P. An intra frame, I, is decoded without reference to any other frame. A bi-directional predictive frame, B, is decoded with reference to frames both previous and forward in time and a predictive frame, P, is decoded with reference to a previous frame. Each frame of whatever kind, I, B, or P is composed of group of slices 14. Each slice includes a number of macro-blocks 16. Each macroblock may be partitioned to include four blocks 18, of luma and two blocks 20 of chroma. Each block is an 8 by 8, 64 pixel array 22.

Figure 2:
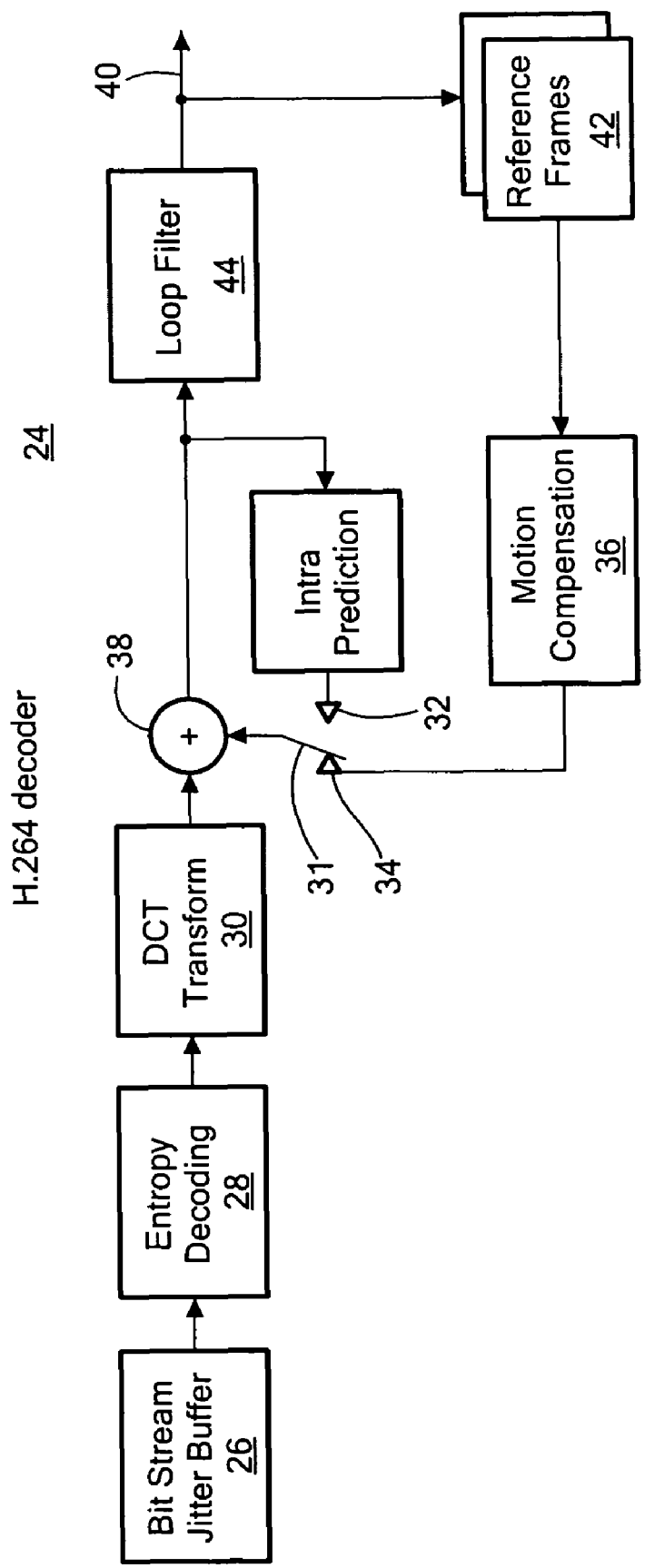
FIG. 2 is a schematic block diagram of a conventional H.264 video decoder.

In a typical decoder 24, FIG. 2, such as an H.264 decoder the bit stream 26 is delivered in the frequency domain to the entropy decoder 28 whose output is the quantized transformed coefficients which are reconstructed and inverse transformed in IDCT transform circuit 30 which transforms the bit stream from the frequency domain to the time domain. If the bit stream 26 input frame was an intra frame, I, switch 31 will be swung to position 32 connected to intra prediction circuit 33. If it is a bidirectional, B, or predictive, P, it will be swung to position 34 connecting the motion compensation prediction circuit 36 to summing circuit 38 for adding the prediction error (DCT residuals) with the motion compensation prediction. Summing circuit 38 output is passed to the deblocking filter 44 to reduce the image blockiness before delivery to output 40. In position 34, motion compensation prediction refers back to a previous frame for a predicted, P, frame or to both a future and past frame 42 if the incoming frame is a bidirectional B frame.

Figure 3:
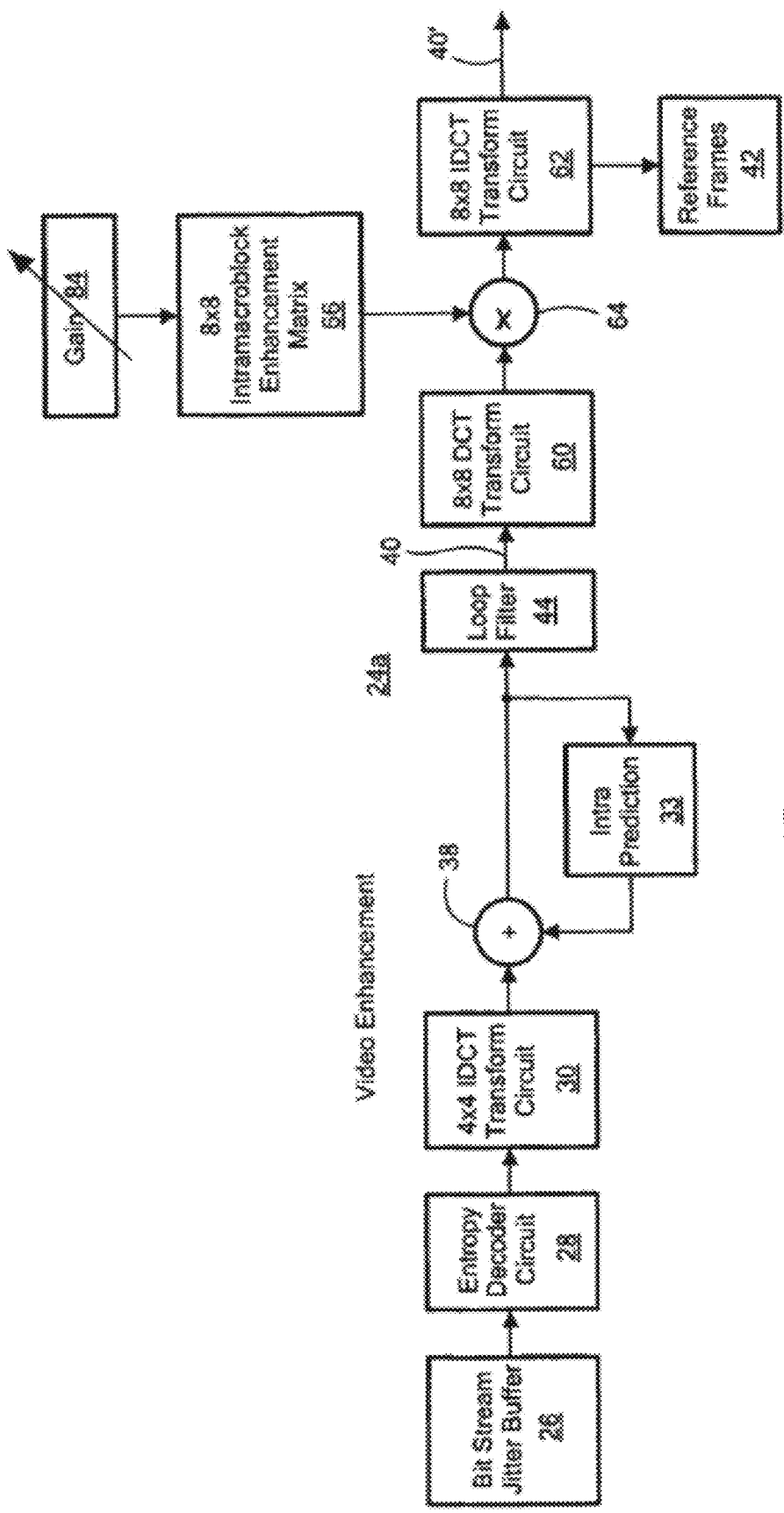
FIG. 3 is an H.264 video decoder configured to process intra or I frames modified according to this invention.
Figure 4:
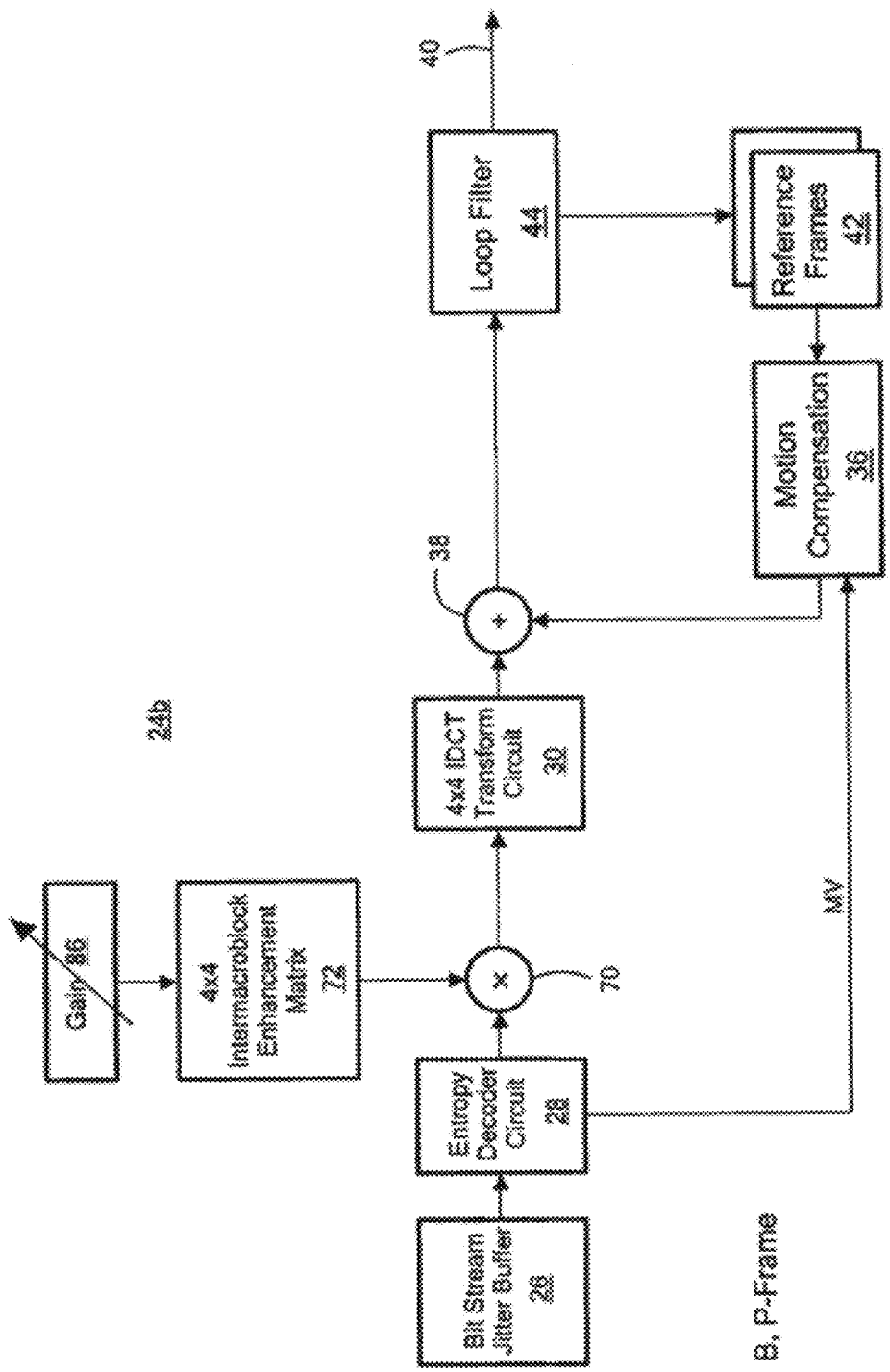
FIG. 4 is an H.264 video decoder configured to process inter or P and B frames modified according to this invention.

Video decoders 24a and 24b in, FIGS. 3, and 4, respectively, are video decoder 24 from FIG. 2 in the two different configurations offered by switch 31 and with the inventive structures applied.

With switch 31, FIG. 2, in position 32 the video decoder is configured, FIG. 3, to deal with I frames and process intramacroblocks. In accordance with the invention there is added in FIG. 3, two transform circuits 60 and 62, a multiplier circuit 64, and an intramacroblock enhancement matrix 66. Transform circuit 60 is a discrete cosine like transform (DCT); transform circuit 62 is an inverse discrete cosine like transform (IDCT). Enhancement matrix 66 is shown as a rank 8 or 8×8 matrix. Transform circuits 60 and 62 also provide an 8×8 matrix of values. Transform circuit 60 is responsive to the decoder intramacroblock output 40 for converting the decoded video intramacroblock output at 40 to a matrix of spatial/Transform domain coefficients. Intramacroblock enhancement matrix 66 has a corresponding matrix of elements. Multiplier circuit 64 combines the spatial domain coefficients from transform circuit 60 with the corresponding intramacroblock enhancement matrix elements from enhancement matrix 66 to provide enhanced spatial coefficients at its output. Transform circuit 62 performs the inverse DCT and converts the enhanced spatial coefficients to the temporal domain to generate an enhanced decoded intra macroblock output 40'

Figures 5, 6:
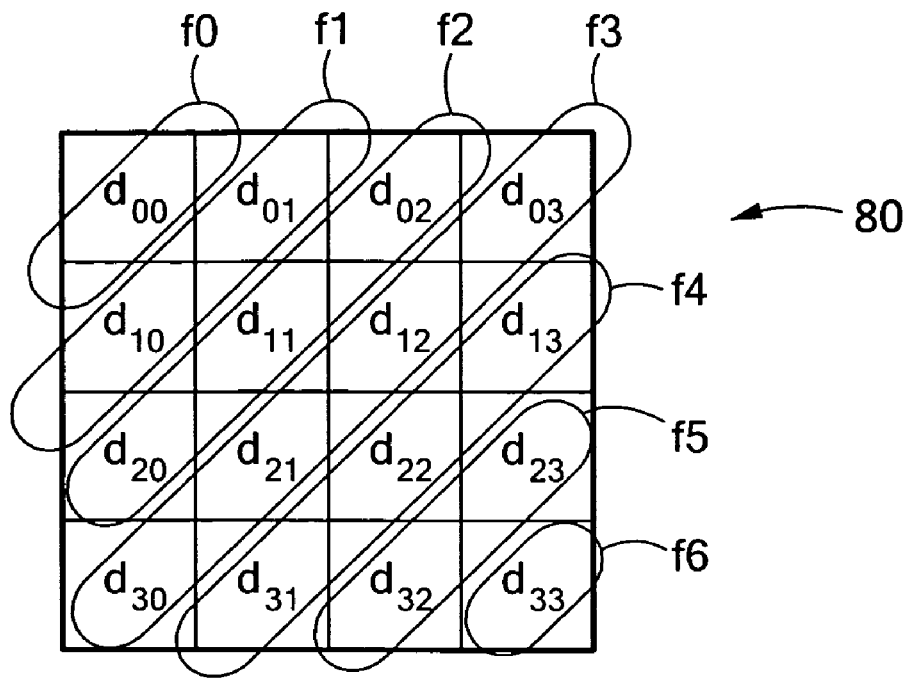
FIG. 5 is an illustration of a matrix of spatial/Transform domain coefficients.
FIG. 6 is an illustration of an enhancement matrix according to this invention.

With switch 31, FIG. 2, thrown to the other position 34 to process inter or P, B frames the required additional circuitry is even simpler as shown in FIG. 4. There is a multiplier 70 and an intermacroblock enhancement matrix 72. Here intermacroblock enhancement matrix 72 is a rank 4 matrix of 4×4 elements. Multiplier circuit 70 combines the spatial domain intermacroblock residual coefficients from entropy decoding circuit 28, which is already a part of the decoder, with the corresponding intramacroblock enhancement matrix elements of intermacroblock enhancement matrix 72 to provide enhanced spatial residual coefficients to the inverse (integer IDCT like) transform circuit 30 which again is already a part of the decoder (all advanced video decoders like H.264 WMV and VC1 are using an "integer" transform that approximates the DCT/IDCT using a simple to implement transform). Intermacroblock enhancement matrix 72 is a 4×4 rank 4 matrix and IDCT like transform circuit 30 likewise provides a 4×4 matrix. The enhancement of an intermacroblock can be seen as simple as an additional multiply per residual coefficient. Based on the fact that the intra to inter frame ratio is 1:30 (one intra frame every 30 inter frames) to get high video compression this approach adds low additional MIPS and low additional complexity to an existing decoder. The matrix of spatial/Transform domain coefficients 80, FIG. 5, is depicted as a rank 4, 4×4 matrix. In the upper left hand corner there is coefficient $d_{00}$ which forms group $f_0$. Group $f_1$ includes coefficients $d_{10}$ and $d_{01}$. Group $f_2$ includes coefficients $d_{20}$, $d_{11}$ and $d_{02}$ and so on with groups $f_3$, $f_4$, $f_5$, and $f_6$. The spatial frequency is lowest for the group $f_0$ and increases through $f_1$, $f_2$, $f_3$, $f_4$, reaching the highest point at $f_6$. The enhancement matrix whether it be intramacroblock 66, FIG. 3, or intermacroblock 72 is illustrated simply in FIG. 6 as a 4×4 rank 4 matrix 82. Each coefficient in the matrix of FIG. 5 corresponds to an element in enhancement matrix 82, FIG. 6. Thus, looking at enhancement matrix 82 in FIG. 6 and spatial coefficients matrix 80 in FIG. 5 together, it can be seen that element 0 of enhancement matrix 82 corresponds to the coefficient $d_{00}$ (DC) in matrix 80. Elements $c_1$ and $c_1$ correspond to coefficients $d_{01}$, and $d_{10}$ and so on.

While the spatial frequency increases from $d_{00}$ to $d_{33}$ the energy is the opposite. Energy is highest at $d_{00}$ and decreases toward $d_{33}$. Thus, by preserving the upper left corner the majority of the image information is preserved. But by manipulating the lower energy—higher spatial frequency information toward $d_{33}$, the image can be sharpened, because the higher spatial frequency information contains the edge information.

The intramacroblock enhancement matrix 66 and the intermacroblock enhancement matrix 72 may be the same or different rank. In the intramacroblock enhancement matrix and intermacroblock enhancement matrix the same spatial frequencies maybe multiplied with the same enhancement element or different enhancement elements. The intermacroblock enhancement matrix 72 may have the same rank as the output of the entropy decoder circuit 28. The intramacroblock enhancement matrix 66 and intermacroblock enhancement matrix 72 may include gain adjust circuits 84 and 86, respectively, which may be used to vary all of the enhancement matrix elements 0 through $c_6$ uniformly, all together as a group, or in subgroups corresponding to the groups $f_0$-$f_6$, for example, or individually. The enhancement elements of the intramacroblock enhancement matrix 66 may be different than those of the intermacroblock enhancement matrix 72. The video decoder shown here is an H.264 decoder, but this invention is applicable to any video decoder, for example MPEG4, WMV, VC1. The H.264 decoder in this specific embodiment may be a base or main profile decoder and the intermacroblock enhancement matrix may have a rank of 4, or it may be a high profile H.264 decoder and the intermacroblock enhancement matrix 72 may have a rank of 8.

Figure 7:
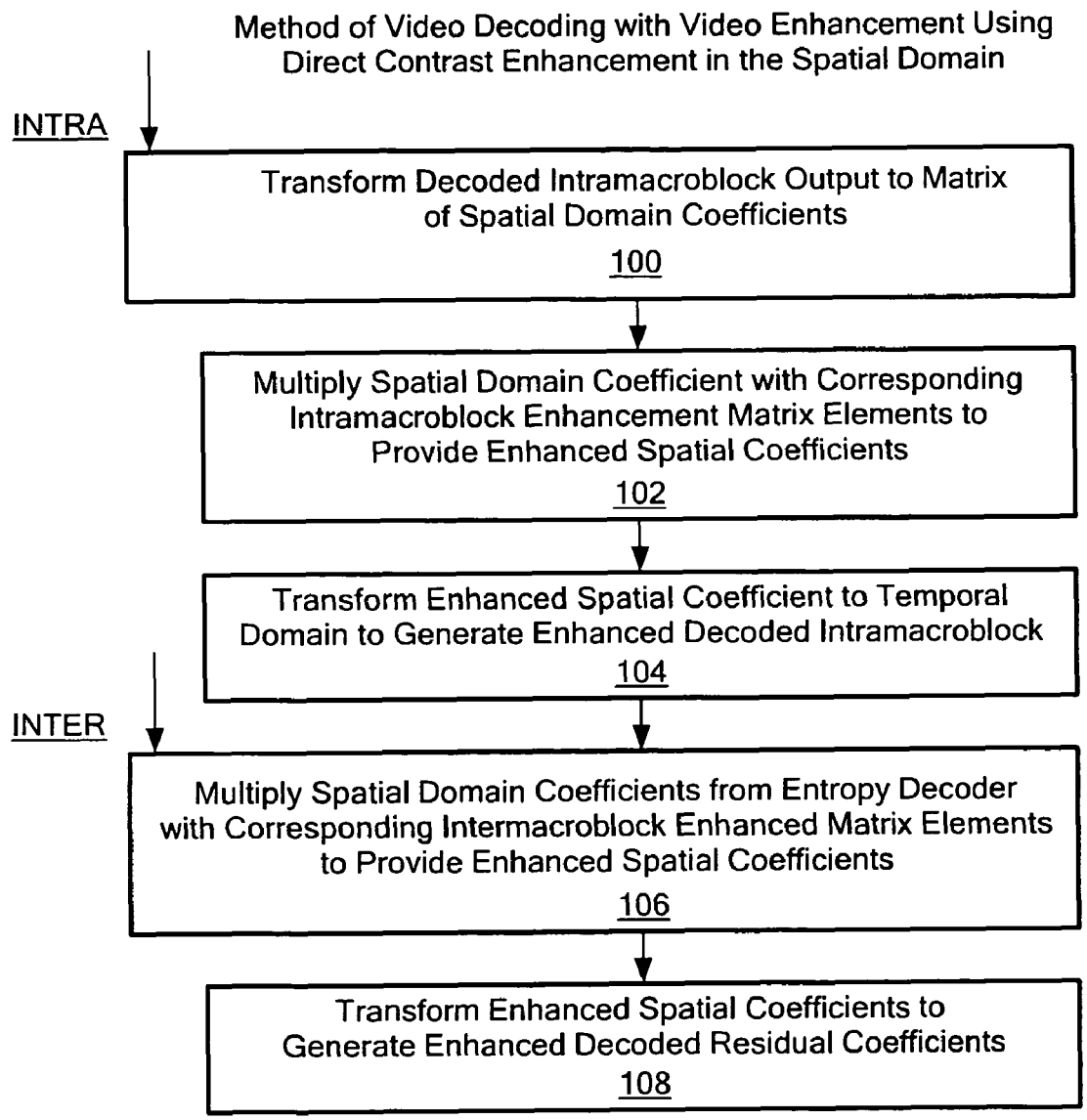
FIG. 7 illustrates the methods of enhancing inter (P, B) frames and intra (I) frames according to this invention.

The invention also concerns a method of video decoding with video enhancement using direct contrast enhancement in the spatial domain as shown in FIG. 7, where the process for both intra- and intermacroblock processing is shown. For intramacroblock processing the intramacroblock output is transformed to a matrix of spatial domain coefficients 100. Then the spatial domain coefficients are multiplied with corresponding intramacroblock enhancement elements to provide enhanced spatial coefficients 102. The enhanced spatial coefficients are then transformed 104 to the temporal domain to generate an enhanced decoded intra-macroblock. For intermacroblock processing the spatial domain coefficients from the entropy decoder are multiplied 106 with the corresponding intermacroblock enhancement matrix elements to provide enhanced spatial coefficients. The enhanced spatial coefficients are transformed to generate enhanced decoded residual coefficients 108.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A video decoder with video enhancement using direct contrast enhancement in a spatial domain comprising:
    a transform circuit responsive to a decoder intrablock output for converting a decoded video intramacroblock output to a matrix of spatial domain coefficients;
    a storage device having the following stored thereon:
        an intramacroblock enhancement matrix having a corresponding matrix of elements; and
        an intermacroblock enhancement matrix having a corresponding matrix of elements;
    an intramacroblock multiplier circuit for combining the spatial domain coefficients with the corresponding intramacroblock enhancement matrix elements to provide enhanced spatial coefficients;
    an inverse transform circuit responsive to said intramacroblock multiplier circuit for converting said enhanced spatial coefficients to a temporal domain to generate an enhanced decoded intramacroblock output; and
    an intermacroblock multiplier circuit for combining spatial domain intermacroblock coefficients from an entropy decoder of the video decoder with the corresponding intermacroblock enhancement matrix elements to provide enhanced spatial coefficients to the inverse transform circuit of the video decoder.

2. The video decoder of claim 1 in which said intramacroblock enhancement matrix and intermacroblock enhancement matrix are of different rank.

3. The video decoder of claim 1 in which in said intramacroblock enhancement matrix and intermacroblock enhancement matrix the same spatial frequencies have the same enhancement element.

4. The video decoder of claim 1 in which said intermacroblock enhancement matrix has the same rank as said entropy decoder.

5. The video decoder of claim 1 in which said enhancement elements are different for each of said enhancement matrices.

6. The video decoder of claim 1 in which said intermacroblock and said intramacroblock enhancement matrices include a gain adjust circuit for varying the enhancement matrix elements.

7. The video decoder of claim 6 in which the gains of said gain adjust circuits are different for said enhancement matrices.

8. The video decoder of claim 6 in which the gains of said gain adjust circuits are the same for said enhancement matrices.

9. The video decoder of claim 1 in which said video decoder is an H.264 decoder.

10. The video decoder of claim 9 in which said intramacroblock enhancement matrix has a rank of 8.

11. The video decoder of claim 9 in which said transform circuit is an 8 rank DCT and said inverse transform circuit is an 8 rank IDCT.

12. The video decoder of claim 9 in which said H.264 decoder is base profile and said intermacroblock enhancement matrix has a rank of 4.

13. The video decoder of claim 9 in which said H.264 decoder is main profile and said intermacroblock enhancement matrix has a rank of 4.

14. The video decoder of claim 9 in which said H.264 decoder is high profile and said intermacroblock enhancement matrix has a rank of 8.

15. The video decoder of claim 1 in which the transform circuit is a DCT circuit.

16. The video decoder of claim 15 in which the inverse transform circuit is a IDCT circuit.

17. The video decoder of claim 1 in which the inverse transform circuit of the video decoder is integer transform circuit.

18. A method of video decoding with video enhancement using direct contrast enhancement in the spatial domain comprising:
    transforming a decoded intramacroblock output to a matrix of spatial domain coefficients;
    receiving an intramacroblock enhancement matrix having a corresponding matrix of elements;
    multiplying the spatial domain coefficients with the corresponding intramacroblock enhancement matrix elements to provide enhanced spatial coefficients;
    inverse-transforming said enhanced spatial coefficients to a temporal domain to generate an enhanced decoded intramacroblock
    receiving an intermacroblock enhancement matrix having a corresponding matrix of elements;
    multiplying spatial domain intermacroblock coefficients from an entropy decoder of the video decoder with the corresponding intermacroblock enhancement matrix to generate the enhanced intermacroblock residual coefficients.

19. The method of video decoding with video enhancement using direct contrast enhancement in the spatial domain of claim 18 in which said intramacroblock enhancement matrix and intermacroblock enhancement matrix are of different rank.

20. The method of video decoding with video enhancement using direct contrast enhancement in the spatial domain of claim 18 in which in said intramacroblock enhancement matrix and intermacroblock enhancement matrix the same spatial frequencies have the same enhancement element.

21. The method of video decoding with video enhancement using direct contrast enhancement in the spatial domain of claim 18 in which said intermacroblock enhancement matrix has the same rank as said entropy decoder.

22. The method of video decoding with video enhancement using direct contrast enhancement in the spatial domain of claim 18 in which said enhancement elements are different for each of said enhancement matrices.

23. The method of video decoding with video enhancement using direct contrast enhancement in the spatial domain of claim 18 further including adjusting the gains of said enhancement matrices.

24. The method of video decoding with video enhancement using direct contrast enhancement in the spatial domain of claim 18 in which the video decoder is an H.264 decoder.

25. The method of video decoding with video enhancement using direct contrast enhancement in the spatial domain of claim 24 in which the intramacroblock enhancement matrix has a rank of 8.

26. The method of video decoding with video enhancement using direct contrast enhancement in the spatial domain of claim 24 in which said H.264 decoder is a base profile and said intermacroblock enhancement has a rank of 4.

27. The method of video decoding with video enhancement using direct contrast enhancement in the spatial domain of claim 24 in which said H.264 decoder is a high profile and said intermacroblock enhancement has a rank of 8.

* * * * *